(12) United States Patent
Kulkarni et al.

(10) Patent No.: US 7,001,963 B2
(45) Date of Patent: Feb. 21, 2006

(54) COBALT IMPRINTED POLYMER COMPOSITION FOR SELECTIVE REMOVAL OF COBALT, PROCESS FOR PREPARATION THEREOF, AND PROCESS FOR REMOVAL OF COBALT

(75) Inventors: Mohan Gopalkrishna Kulkarni, Maharashtra (IN); Rohini Nitin Karmalkar, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/976,872

(22) Filed: Nov. 1, 2004

(65) Prior Publication Data

US 2005/0070677 A1 Mar. 31, 2005

Related U.S. Application Data

(62) Division of application No. 10/671,868, filed on Sep. 29, 2003.

(51) Int. Cl.
*C08F 126/06* (2006.01)
(52) U.S. Cl. ............... 526/258; 526/303.1; 526/317.1; 526/310; 526/227
(58) Field of Classification Search ............... 526/258, 526/303.1, 317.1, 310, 227
See application file for complete search history.

(56) References Cited

U.S. PATENT DOCUMENTS 5,780,578 A * 7/1998 Mashelkar et al. ......... 528/327

OTHER PUBLICATIONS

Kuchen et al., "Metal-Ion Selective Resins by Matrix Imprint with Methacrylates", Angew. Chem. Int. Ed., vol. 27, No. 12, 1988, pp. 1695-1697, XP002295591.

* cited by examiner

*Primary Examiner*—William K. Cheung
(74) *Attorney, Agent, or Firm*—Nixon & Vanderhye P.C.

(57) ABSTRACT

The present invention provides a polymer composition for the selective removal of cobalt, a process for the preparation thereof and the process for removal of cobalt, using the said polymer composition. More particularly it relates to a cross-linked polymer composition prepared by the molecular imprinting technique. The preparation of the cross linked polymer involves selection of vinyl monomers bearing functional groups that bind to cobalt, formation of a complex of these monomers with cobalt and subsequent polymerization of the complex in presence of a crosslinker. The process for the removal of cobalt comprises treating the solution containing a mixture of cobalt and other metal ions with the polymer under conditions sufficient for cobalt to form a complex with the polymer and separating the polymer from the cobalt depleted solution.

8 Claims, No Drawings

COBALT IMPRINTED POLYMER COMPOSITION FOR SELECTIVE REMOVAL OF COBALT, PROCESS FOR PREPARATION THEREOF, AND PROCESS FOR REMOVAL OF COBALT

This is a divisional of application Ser. No. 10/671,868, filed Sep. 29, 2003.

FIELD OF THE INVENTION

The present invention relates to a cobalt imprinted polymer composition for the selective removal of cobalt, a process for the preparation thereof and the process for removal of cobalt, using the said polymer composition. More particularly it relates to a cross linked polymer composition prepared by the molecular imprinting technique having the general formula (1)

$$A_{(x)}B_{(y)}C_{(z)}D_{(f)}$$

wherein A is any vinyl monomer containing hydroxyl group, B is any vinyl monomer bearing acidic group, C is any vinyl monomer containing an amino group and D is a cross linker bearing vinyl group and x, y, z and f are the mole fractions of A, B, C and D respectively in the final polymer and vary such that $0 < x,y,z < 1$ and f can vary between 0 and 1 and wherein $x+y+z+f=1$.

The complex of the monomers and cobalt is polymerized in the presence of a cross linker in appropriate solvents. Cobalt is extracted by dilute acid treatment to give a polymer that has binding sites for cobalt. The process for the selective removal of cobalt involves contacting a mixture consisting of cobalt and other metal ions with the cobalt imprinted polymer and removing the cobalt depleted mixture. The polymer can be regenerated by conventional methods.

BACKGROUND OF THE INVENTION

The separation of metal ions present as contaminants in water is complicated by the presence of organic substances. The two most popular technologies for the removal of metal ions are solvent extraction and ion exchange. Solvent extraction offers the advantage of fast kinetics, high capacities and selectivity (Ritcey, G. M *Separation Science and Technology*, 18, 1617, 1983). But solvent extraction cannot be used for dilute solutions. Ion-exchange resins contain functional groups capable of complexing with the metal ions. The resins can be regenerated and reused. However the disadvantages of these resins are slow reaction kinetics and poor selectivity which also deteriorates in the presence of other competing metal ions (Beauvais, R. A., Alexandros, S. D. *Reactive and Functional Polymers*, 36, 113, 1998).

The application of molecular imprinting for the selective removal of a metal ion was first reported by Nishide (Nishide, H., Deguchi, J., Tsuchida, E. *J. Polym. Sci. Chem. Ed* 15, 3023, 1977) Different approaches have been reported so far for metal ion imprinted resins. In the first approach linear polymer carrying metal ion binding groups or ligands are synthesized. These polymers are then treated with the metal ion to be imprinted and crosslinked with the help of a bifunctional reagent. MIPs selective for metal ions like copper/cobalt/nickel were reported (Effendiev, A. A., Kabanov, V. A., *Pure and Applied Chem.* 54, 2077, 1982.). The copper imprinted polymer so synthesized showed selectivity for copper in the presence of nickel and cobalt ions. In another approach (Kuchen, W. Schram, J. *Angew. Chem. Int. Ed. Engl.* 27, 1695, 1988) isolated a copper complex of acrylic acid and polymerized it with ethylene glycol dimethacrylate. The imprinted resins exhibited an increased affinity for copper in presence of other metal ions like Cd, Zn. Since the resin has to be used in continuous circulation mode, the rebinding kinetics should be fast. Surface imprinted polymers would have a better advantage over conventional imprinted polymers. This was investigated by Dhal et al (1995) by grafting copper (II) complex of N(4-vinylbenzyl imino) diacetic acid on the surface of microporous poly(trimethylol propane trimethacrylate) support. These polymers exhibited selective rebinding of $Cu^{2+}$ and faster binding kinetics. Besides these, amino acid modified crosslinked biopolymers like glucan etc have been used as chelating media for the removal of metal ions like copper, cobalt from brine solutions (Muzzarelli, R. A., Tanfani, F., Emanuelli, M., Bolognini, L. *Biotech. Bioeng.*, 27, 1115, 1985). Though these polymers are superior in their capacity and kinetics of metal ion uptake they are susceptible to attack by microorganism and do not exhibit selectivity for a particular metal. Konishi et al (Konishi S., Saito, K, Furusaki, S. *Ind. Eng. Chem. Res.* 31, 2722, 1992) demonstrated the use of grafted hollow fiber membrane for efficient removal of cobalt ions. The use of NaY zeolite, erionite, and bentonite in the removal of radioactive cobalt from aq. solns. has been investigated (Carrera L. M., Gomez., S., Bosch, P., Bzilbulian, S. *Zeolites*, 13, 622, 1993).

Recently the inventors of the present invention have demonstrated the use of cobalt in bringing different functional group bearing monomers in proximity by complexation and subsequent polymerization of the complex on surface of porous microspheres (Karmalkar, R. N., Kulkarni, M. G., Mashelkar, R. A., *Macromolecules*, 1996, 26, 1366. Lele, B. S., Kulkarni, M. G., Mashelkar, R. A., *React. Funct. Polym*, 1999, 39, 37. Synthetic polymer exhibiting hydrolytic activity, its preparation and use for the conversion of esters and amides to the corresponding alcohol and amine. R. A Mashelkar, M. G. Kulkarni, R. N. Karmalkar., U.S. Pat. No. 5,870,578. July 1998).

The cooperative interactions of the functional groups during template rebinding were established. However, their selectivity for adsorption of cobalt was not investigated. In this patent we have described a process for the preparation of a cobalt imprinted polymer and its application for the selective removal of cobalt from aqueous solutions.

OBJECTS OF THE INVENTION

It is a principal object of the present invention to provide a polymer composition useful for the selective removal of cobalt.

Another object is to provide a process for the preparation of the said polymeric composition.

Still another object is to provide a removal of cobalt from the mixture of metal ions, using the said polymer composition.

Yet another object is to provide a process for the preparation of a cobalt imprinted polymer which form a a complex of the functional groups bearing monomers and cobalt in an appropriate solvent, polymerizing by conventional methods and extracting cobalt from the cross linked polymer to obtain the product.

Yet another object of the present invention is to remove cobalt in presence of large excess of other metal ions, especially iron.

Still another object of the present invention is to remove cobalt from aqueous solutions containing complexing agents and salts.

DETAILED DESCRIPTION OF THE INVENTION

Accordingly the present invention provides a polymer composition for the selective removal of cobalt, having the formula (1)

$$A_{(x)}B_{(y)}C_{(z)}D_{(f)}$$

wherein A is any vinyl monomer containing hydroxyl group, B is any vinyl monomer bearing acidic group, C is any vinyl monomer containing an amino group and D is a cross linker bearing vinyl group and x, y, z and f are the mole fractions of A, B, C and D respectively in the final polymer and vary such that $0<x,y,z<1$ and f can vary between 0 and 1 with $x+y+z+f=1$.

The present invention also provides a process for the preparation of a cobalt-imprinted polymer having the formula (1)

$$A_{(x)}B_{(y)}C_{(z)}D_{(f)}$$

wherein A is any vinyl monomer containing hydroxyl group, B is any vinyl monomer bearing acidic group, C is any vinyl monomer containing an amino group and D is a cross linker bearing vinyl group and x, y, z and f are the mole fractions of A, B, C and D respectively in the final polymer and vary such that $0<x,y,z<1$ and f can vary between 0 and $1.x+y+z+f=1$, the process comprising preparing a complex of the above monomers bearing functional groups and a cobalt source in a solvent, adding a cross linker, a porogen and a free radical initiator to this mixture, polymerizing the mixture to obtain the cobalt imprinted polymer, extracting cobalt from the polymer to obtain the cobalt imprinted polymer composition.

In one of embodiment of the present invention the monomer (A) is selected from the group consisting of 2-hydroxy ethyl methacrylate, 2-hydroxy propyl methacrylate, N-methacryloyl serine and p-styrene phenol.

In another embodiment of the invention, the monomer (B) is selected from the group consisting of N-(4-vinyl benzyl) iminodiacetic acid, acrylic acid, methacrylic acid, N-methacryloyl aspartic acid, N-methacryloyl glutamic acid, Acrylamido methane sulfonic acid, p-vinyl benzoic acid and 2-acetamidoacrylic acid.

In still another embodiment of the invention, the monomer (C) is selected from the group consisting of N-vinyl imidazole, N-methacryloyl histidine, 4(5) vinyl imidazole, 4-vinyl pyridine and p-amino styrene.

In yet another embodiment the crosslinker (D) is selected from the group consisting of ethylene glycol dimethacrylate, triethylene glycol, dimethacrylate, divinyl benzene, trimethylol propane trimethacrylate, N,N' bis acrylamide, and trimethylol propane acrylate, glycerol dimethacrylate, bisphenol A dimethacrylate and bisphenol A diacrylate.

In another embodiment of the present invention the free radical initiator is selected from the group consisting of azobisisobutyronitrile, t-butyl hydroperoxide and benzoyl peroxide.

In yet another embodiment the source of cobalt is a cobalt salt selected from the group consisting of cobalt nitrate, cobalt chloride and cobalt acetate.

In yet another embodiment the solvent is a lower aliphatic alcohol.

In another embodiment of the invention, the porogen is a higher aliphatic alcohol selected from the group consisting of dodecanol, hexanol and octanol. The present invention also provides a process for the removal of cobalt from the mixture of metal ions using the polymeric composition of formula (1) having the formula (1)

$$A_{(x)}B_{(y)}C_{(z)}D_{(f)}$$

wherein A is any vinyl monomer containing hydroxyl group, B is any vinyl monomer bearing acidic group, C is any vinyl monomer containing an amino group and D is a cross linker bearing vinyl group and x, y, z and f are the mole fractions of A, B, C and D respectively in the final polymer and vary such that $0<x,y,z<1$ and f can vary between 0 and $1.x+y+z+f=1$, which comprises contacting a mixture containing cobalt metal ions with a polymeric composition of formula (1) to form a cobalt complex with the polymer, separating the cobalt complex polymer by conventional methods to obtain the mixture devoid of cobalt.

In an embodiment of the present invention the metal ion mixture has a pH in the range of 2 to 6.

In another embodiment of the invention, the quantity of the polymeric composition (1) is 1000 times by wt of the cobalt metal ion concentration in the mixture.

In a feature of the present invention the polymerization of the monomers is carried out thermal or photochemical methods.

In yet another feature the photo polymerization initiator used in the photochemical method is selected from the group consisting of cumyl peroxide, 1-hydroxyl cyclohexyl phenyl ketone, benzophenone and benzoin ethyl ether.

In another feature the other metal ions present in the mixture of metal ion solution to be depleted of Cobalt ions my contain other metal ions such as but not limited to $Ni^{++}$, $Fe^{++}$, $Cu^+$, $Fe^{+++}$, $K^+$, $Na^+$, $Ca^{++}$, $Zn^{++}$, $Mg^{++}$, $Cu^{+++}$.

DETAILED DESCRIPTION OF THE INVENTION

The present invention provides a cobalt imprinted polymer composition for the selective removal of cobalt, having the formula (1)

$$A_{(x)}B_{(y)}C_{(z)}D_{(f)} \qquad (1)$$

wherein A is any vinyl monomer containing hydroxyl group, B is any vinyl monomer bearing acidic group, C is any vinyl monomer containing an amino group and D is a cross linker bearing vinyl group and x, y, z and f are the mole fractions of A, B, C and D respectively in the final polymer and vary such that $0<x,y,z<1$ and f can vary between 0 and 1 with $x+y+z+f=1$.

The present invention also provides a process for the preparation of a cobalt imprinted polymer having the formula (1)

$$A_{(x)}B_{(y)}C_{(z)}D_{(f)} \qquad (1)$$

wherein A is any vinyl monomer containing hydroxyl group, B is any vinyl monomer bearing acidic group, C is any vinyl monomer containing an amino group and D is a cross linker bearing vinyl group and x, y, z and f are the mole fractions of A, B, C and D respectively in the final polymer and vary such that $0<x,y,z<1$ and f can vary between 0 and $1.x+y+z+f=1$, the process comprising preparing a complex of the above monomers bearing functional groups and a cobalt source in a solvent, adding a cross linker, a porogen and a free radical initiator to this mixture, polymerizing the mixture to obtain the cobalt imprinted polymer, extracting cobalt from the polymer to obtain the cobalt imprinted polymer composition.

The monomer (A) is selected from the group consisting of 2-hydroxy ethyl methacrylate, 2-hydroxy propyl methacrylate, N-methacryloyl serine and p-styrene phenol.

The monomer (B) is selected from the group consisting of N-(4-vinyl benzyl) iminodiacetic acid, acrylic acid, methacrylic acid, N-methacryloyl aspartic acid, N-methacryloyl glutamic acid, Acrylamido methane sulfonic acid, p-vinyl benzoic acid and 2-acetamidoacrylic acid.

The monomer (C) is selected from the group consisting of N-vinyl imidazole, N-methacryloyl histidine, 4(5) vinyl imidazole, 4-vinyl pyridine and p-amino styrene.

The crosslinker (D) is selected from the group consisting of ethylene glycol dimethacrylate, triethylene glycol, dimethacrylate, divinyl benzene, trimethylol propane trimethacrylate, N,N' bis acrylamide, and trimethylol propane acrylate, glycerol dimethacrylate, bisphenol A dimethacrylate and bisphenol A diacrylate.

The free radical initiator is selected from the group consisting of azobisisobutyronitrile, t-butyl hydroperoxide and benzoyl peroxide. The source of cobalt is a cobalt salt selected from the group consisting of cobalt nitrate, cobalt chloride and cobalt acetate.

The solvent is a lower aliphatic alcohol selected from the group consisting of dodecanol, hexanol and octanol.

The present invention also provides a process for the removal of cobalt from the mixture of metal ions using the polymeric composition of formula (1) having the formula (1)

$$A_{(x)}B_{(y)}C_{(z)}D_{(f)} \tag{1}$$

wherein A is any vinyl monomer containing hydroxyl group, B is any vinyl monomer bearing acidic group, C is any vinyl monomer containing an amino group and D is a cross linker bearing vinyl group and x, y, z and f are the mole fractions of A, B, C and D respectively in the final polymer and vary such that $0<x,y,z<1$ and f can vary between 0 and 1. $x+y+z+f=1$, which comprises contacting a mixture containing cobalt metal ions with a polymeric composition of formula (1) to form a cobalt complex with the polymer, separating the cobalt complex polymer by conventional methods to obtain the mixture devoid of cobalt.

The metal ion mixture has a pH in the range of 2 to 6. The quantity of the polymeric composition (1) is 1000 times by wt of the cobalt metal ion concentration in the mixture. The polymerization of the monomers is carried out thermal or photochemical methods. In yet another feature the photo polymerization initiator used in the photochemical method is selected from the group consisting of cumyl peroxide, 1-hydroxyl cyclohexyl phenyl ketone, benzophenone and benzoin ethyl ether.

In another feature the other metal ions present in the mixture of metal ion solution to be depleted of Cobalt ions my contain other metal ions such as but not limited to $Ni^{++}$, $Fe^{++}$, $Cu^+$, $Fe^{+++}$, $K^+$, $Na^+$, $Ca^{++}$, $Zn^{++}$, $Mg^{++}$, $Cu^{+++}$.

The polymer composition of formula (1), its method of preparation and the process to remove the cobalt ions as described hereinabove is described with reference to examples hereunder, which are illustrative only and should not be construed to limit the scope of the present invention in any manner whatsoever.

EXAMPLE 1

This example describes the synthesis of a cobalt-imprinted polymer.

1.3 g 2-hydroxyethyl methacrylate (0.01 moles), 5 g (0.02 moles) N-(4-vinylbenzyl) iminodiacetic acid, 0.94 g (0.01 moles) N-vinyl imidazole were mixed in a test tube. To this 2.38 g cobalt chloride (0.01 moles) and 20 ml methanol was added. 4 g ethylene glycol dimethacrylate (0.02 moles) was added. 80 mg azobisisobutyronitrile was added as the initiator and the mixture was polymerized at 65° C. for 24 hours. The polymer was isolated and crushed into fine powder. The yield was 7 g (89%). Cobalt was extracted from the cross-linked polymer using dilute hydrochloric acid for 4 days. The polymer was then washed with distilled water and dried in the oven at 50° C. The non-imprinted polymer was synthesized in a similar way but in absence of cobalt chloride.

EXAMPLE 2

This example describes the synthesis of a cobalt-imprinted polymer.

2-hydroxyethyl methacrylate, 2.08 g (0.016 moles), methacrylic acid, 2.75 g (0.032 moles), N-vinyl imidazole, 1.504 g (0.016 moles) and 1.91 g cobalt chloride (0.016 moles) were mixed in a test tube. To this 10 ml methanol was added. The mixture was stirred for one hour till all the cobalt chloride dissolved. Methanol was then evaporated under vacuum. To this 65 mg azobisisobutyronitrile was added and the test tube was purged with nitrogen for 15 minutes. The polymerization was carried out at 65° C. for 20 hours. The polymer was isolated in the form of a rod. The yield was 6.0 g. The rod was crushed into fine powder. Cobalt was extracted using dilute hydrochloric acid for nearly 72 hours and subsequently the polymer was washed with distilled water. After drying, the polymer was sieved. The size range 37–75 was used for further studies.

EXAMPLE 3

This example describes the synthesis of a non-imprinted polymer.

2-hydroxyethyl methacrylate, 2.08 g (0.016 moles), methacrylic acid, 2.75 g (0.032 moles), and N-vinyl imidazole, 1.504 g (0.016 moles) were mixed in a test tube. To this 65 mg azobisisobutyronitrile was added and the test tube was purged with nitrogen for 15 minutes. The polymerization was carried out at 65° C. for 20 hours. The polymer was isolated in the form of a rod. The yield was 5.9 g. The rod was crushed into fine powder. The polymer was washed thoroughly with methanol to remove unreacted monomers. After drying, the polymer was sieved. The size range 37–75, was used for further studies.

EXAMPLE 4

This example describes the selective adsorption of cobalt over iron by the imprinted polymer.

50 mg polymer synthesized as described in example 2 was weighed and taken in an Eppendorf tube. A solution containing both cobalt and iron was prepared by dissolving cobalt acetate and iron acetate in citrate buffer (1 M, pH=4.0) so that the Co and Fe content was 700 and 350 ppm respectively. The tube was gently shaken for 48 hours. After 48 hours the tube was centrifuged and the supernatant was analyzed by Atomic absorption spectroscopy for cobalt and UV spectroscopy for iron using 1, 10 phenanthroline. The capacity of the resin was found to be 7.2 mg/g for cobalt and 1.55 mg/g for iron. The ratio of Fe/Co in the initial solution was 0.5 and after adsorption the ratio became 0.79. This indicated that the resin adsorbed cobalt preferentially over iron.

EXAMPLE 5

This example describes the adsorption of cobalt and iron by imprinted and non-imprinted polymers.

50 mg imprinted polymer synthesized as described in example 2 and 50 mg non imprinted polymer synthesized as described in example 3 were taken in two Eppendorf tubes. A solution of cobalt acetate and iron acetate was prepared in citrate buffer such that the concentration of cobalt was 30 ppm and that of iron was 1080 ppm. 1 ml of the solution was added to each of the tubes and the tubes were gently shaken for 48 hours. After centrifugation the supernatant was analyzed for cobalt and iron as described in example 3. The capacity of the imprinted polymer for cobalt was found to be 0.508 mg/g and that for iron 2 mg/g. The capacity of the non-imprinted polymer for cobalt was 0.104 mg/g and for iron 2.8 mg/g. The ratio of Fe/Co in the feed solution was 36 and after adsorption on the imprinted polymer the ratio was 111. In case of the non-imprinted polymer the ratio after adsorption was 36.3. This indicated that the imprinted polymer adsorbed more cobalt than iron than the non-imprinted polymer. The ratio of cobalt adsorbed by the imprinted polymer to that of the non-imprinted polymer was 4.88. As a result the solution treated with the imprinted polymer was enriched in iron over cobalt.

EXAMPLE 6

This example describes the selective adsorption of cobalt by imprinted and non-imprinted polymers.

50 mg imprinted polymer synthesized as described in example 2 and 50 mg non imprinted polymer synthesized as described in example 3 were taken in two Eppendorf tubes. A solution of cobalt acetate and iron acetate was prepared in citrate buffer such that concentration of cobalt was 9 ppm and iron was 980 ppm. 1 ml solution was added to each of the Eppendorf tubes and shaken gently for 48 hours. The supernatant was analyzed by AAS for cobalt and using 1,10 phenanthroline indicator for iron. The capacity of the imprinted polymer for cobalt was 0.176 mg/g and that for iron was 1.6 mg/g. The capacity of the non-imprinted polymer for cobalt was 0.052 mg/g and that for iron was 1.7 mg/g. The ratio of Fe/Co in the feed solution was 108. After adsorption on the imprinted polymer no cobalt was detected in the solution. In case of non-imprinted polymer the ratio of Fe/Co in the supernant was 140. The ratio of cobalt adsorbed by the imprinted polymer to that of the non-imprinted polymer is 3.4.

EXAMPLE 7

This example describes the selective adsorption of cobalt over nickel by the imprinted polymer.

50 mg imprinted polymer synthesized as described in example 2 and 50 mg non imprinted polymer described in example 3 was taken in an Eppendorf tube. A solution of cobalt chloride and nickel chloride was prepared in pH 4.0 citrate buffer. The concentration of cobalt and nickel in the solution was 400 ppm each. 1 ml of this solution was added to the imprinted and non-imprinted polymer. After 48 hours the supernant and the initial solutions were analyzed by AAS. The imprinted polymer adsorbed 0.680 mg/g cobalt and 0.370 mg/g nickel. The non-imprinted polymer adsorbed 0.128 mg/g cobalt and 0.160 mg/g nickel. The imprinted was thus more selective for cobalt than nickel.

EXAMPLE 8

This example describes the synthesis of porous imprinted polymer.

1.3 g 2-hydroxyethyl methacrylate (0.01 moles), 1.72 g methacrylic acid (0.02 moles), 0.94 g (0.01 moles) N-vinyl imidazole were mixed in a test tube. To this 2.38 g cobalt chloride (0.01) moles) and 5 ml ethanol was added. 4 g ethylene glycol dimethacrylate (0.02 moles) and 1 ml dodecanol was added as the porogen. 80 mg azobisisobutyonitrile was added as the porogen and the mixture was polymerized at 65° C. for 24 hours. The polymer was isolated and crushed into fine powder. The yield was 7 g (89%). Cobalt was extracted from the crosslinked polymer using dilute hydrochloric acid for 4 days. The polymer was then washed with distilled water and dried in the oven at 50° C. The non-imprinted polymer was synthesized in a similar way but in absence of cobalt chloride.

EXAMPLE 9

This example describes the selective adsorption of cobalt over iron by porous polymers from solutions containing complexing agents 20 mg imprinted polymer and non-imprinted polymer prepared as described in example 8 were weighed in two Eppendorf tubes. A solution of cobalt chloride and ferrous sulfate was prepared in pH 4.0 citrate buffer. To this ethylene diamine tetraacetic acid and ascorbic acid was added so that the concentration of EDTA was 400 ppm and that of ascorbic acid was 300 ppm. The pH was adjusted to 4.0 using dilute sodium carbonate. The concentration of cobalt was 160 ppm and iron was 4000 ppm. 1 ml of this solution was added to the tubes containing the imprinted and non-imprinted polymer. After 48 hours the supernatant was analyzed for cobalt by AAS and for iron by the 1, 10 phenanthroline method. The imprinted polymer adsorbed 3.5 mg/g cobalt and 12 mg/g iron. The ratio of Fe/Co in the feed solution was 25 and after adsorption on the cobalt imprinted polymer was 42 and for the non-imprinted polymer the ratio was 32. The non-imprinted polymer adsorbed 2 mg/g cobalt and 7.5 g/g iron. Thus the solution was more enriched in iron after adsorption of cobalt by the imprinted cross-linked polymer.

EXAMPLE 10

This example describes the selective adsorption of cobalt by porous polymers from solutions containing complexing agents 50 mg imprinted polymers as well as non imprinted polymers as controls prepared as described in example 8, were weighed in two Eppendorf tubes. A solution of cobalt chloride and ferrous sulfate was prepared in pH 4.0 citrate buffer. To this ethylene diamine tetraacetic acid and ascorbic acid was added so that the concentration of EDTA was 400 ppm and that of ascorbic acid was 300 ppm. The pH was adjusted to 4.0 using dilute sodium carbonate. The concentration of cobalt was 50 ppm and that of iron was 25000 ppm. After 48 hours the supernant was analyzed for cobalt by AAS and for iron by the 1, 10 phenanthroline method. The imprinted polymer adsorbed 0.196 mg/g cobalt and 3.2 mg/g iron. The ratio of Fe/Co in the feed solution was 500 and after adsorption on the cobalt-imprinted polymer it was found to be 579. The non-imprinted polymer adsorbed 0.060 mg/g cobalt and 2.5 mg/g iron. The ratio of Fe/Co in the supernant was 500. This indicated that the imprinted polymer adsorbed more cobalt than iron as compared to the non-MIP. The imprinted polymer adsorbed cobalt even when iron was present in large excess. Thus the content of cobalt in the treated solution was much lower as compared to the initial.

EXAMPLE 11

This example describes the synthesis of cobalt imprinted polymers by photo polymerization.

1.3 g 2-hydroxyethyl methacrylate (0.01 moles), 1.72 g methacrylic acid (0.02 moles), 0.94 g (0.01 moles) N-vinyl imidazole were mixed in a test tube. To this 2.38 g cobalt chloride (0.01 moles) and 5 ml ethanol was added. 4 g ethylene glycol dimethacrylate (0.02 moles) and 1 ml dodecanol was added as the porogen. 80 mg azobisisobutyronitrile was added as the photo initiator and polymerization was carried out at ambient temperature for 12 hours. The polymer was isolated and crushed into fine powder. The yield of the polymer was 77%. Cobalt was extracted from the crosslinked polymer using dilute hydrochloric acid for 4 days. The polymer was then washed with distilled water and dried in the oven at 45° C. The non-imprinted polymer was synthesized in a similar way but in absence of cobalt chloride.

EXAMPLE 12

This example describes the selective adsorption of cobalt by the polymers prepared using photo polymerization.

25 mg imprinted polymers as well as non-imprinted polymers prepared as described in example 11 were weighed in two Eppendorf tubes. A solution of cobalt chloride and ferrous sulfate was prepared in pH 4.0 citrate buffer. To this ethylene diamine tetraacetic acid and ascorbic acid was added so that the concentration of EDTA was 400 ppm and that of ascorbic acid was 300 ppm. The pH was adjusted to 4.0 using dilute sodium hydroxide. The concentration of cobalt was 65 ppm and that of iron was 19950 ppm. After 48 hours the supernatant was analyzed for cobalt by AAS and for iron by the 1, 10 phenanthroline method. The imprinted polymer adsorbed 0.44 mg/g cobalt and 5.0 mg/g iron. The ratio of Fe/Co in the feed solution was 307 and after adsorption on the cobalt imprinted polymer was found to be 322. The non-imprinted polymer adsorbed 0.120 mg/g cobalt and 6.5 mg/g iron. The ratio of Fe/Co in the feed solution was 307 and after adsorption on the imprinted polymer it was found to be 289. This indicated that the imprinted polymer adsorbed more cobalt as compared to the non-imprinted polymer. The imprinted polymer adsorbed cobalt even when iron was present in large excess. Thus the content of cobalt in the treated solution was lower as compared to the initial.

EXAMPLE 13

This example describes the synthesis of cobalt imprinted polymer.

1.3 g 2-hydroxyethyl methacrylate (0.01 moles), 1.72 g methacrylic acid (0.02 moles), 2.23 g (0.01 moles) N-methacryloyl histidine were mixed in a test tube. To this 2.38 g cobalt chloride (0.01 moles) and 20 ml methanol was added. The mixture was stirred for 1 hr and methanol was evaporated under vacuum and 4 g ethylene glycol dimethacrylate (0.02 moles) was added. 80 mg azobisisobutyronitrile was added as the initiator and the mixture was polymerized at 65° C. for 24 hours. The polymer was isolated and crushed into fine powder. The yield was 7 g (89%). Cobalt was extracted from the cross-linked polymer using dilute hydrochloric acid for 4 days. The polymer was then washed with distilled water and dried in the oven at 50° C. The non-imprinted polymer was synthesized in a similar way but in absence of cobalt chloride.

EXAMPLE 14

This example describes the selective adsorption of cobalt by the polymers prepared as described in example 13.

25 mg imprinted polymer as well as the non-imprinted polymer prepared as described in example 12 were weighed in two Eppendorf tubes. A solution of cobalt chloride and ferrous sulfate was prepared in pH 4.0 citrate buffer. To this ethylene diamine tetraacetic acid and ascorbic acid was added so that the concentration of EDTA was 400 ppm and that of ascorbic acid was 300 ppm. The pH was adjusted to 4.4 using dilute sodium hydroxide. The concentration of cobalt was 16 ppm and that of iron was 8000 ppm. After 48 hours the supernatant was analyzed for cobalt by AAS and for iron by the 1, 10 phenanthroline method. The imprinted polymer adsorbed 0.016 mg/g cobalt and 50 mg/g iron. The ratio of Fe/Co in the feed solution was 500 and after adsorption on the MIP it was found to be 949. The non-imprinted polymer adsorbed 0.002 mg/g cobalt and 52 mg/g iron. The ratio of Fe/Co in the test solution was 500 and after adsorption on the cobalt-imprinted polymer it was found to be 387. This indicated that the imprinted polymer adsorbed more cobalt as compared to the non-imprinted polymer. The imprinted polymer adsorbed cobalt even when iron was present in large excess. Thus the content of cobalt in the treated solution was lower as compared to the initial.

EXAMPLE 15

This example describes the selective adsorption of cobalt by the polymers prepared as described in example 13.

25 mg imprinted polymer as well as the non-imprinted polymer prepared as described in example 13 were weighed in two Eppendorf tubes. A solution of cobalt chloride and ferrous sulfate was prepared in pH 4.0 citrate buffer. To this ethylene diamine tetraacetic acid and ascorbic acid was added so that the concentration of EDTA was 400 ppm and that of ascorbic acid was 300 ppm. The pH was adjusted to 3.2. The concentration of cobalt was 12.5 ppm and that of iron was 2500 ppm. After 48 hours the supernatant was analyzed for cobalt by AAS and for iron by the 1, 10 phenanthroline method. The imprinted polymer adsorbed 0.0075 mg/g cobalt and 25 mg/g iron. The ratio of Fe/Co in the initial solution was 200 and after adsorption on the imprinted polymer it was found to be 300. The non-imprinted polymer adsorbed 0.001 mg/g cobalt and 27 mg/g iron. The ratio of Fe/Co in the feed solution was 200 and after adsorption on the MIP it was found to be 159. This indicated that the imprinted polymer adsorbed more cobalt as compared to the non-imprinted or control polymer. The imprinted polymer adsorbed cobalt even when iron was present in large excess. Thus the content of cobalt in the treated solution was lower as compared to the initial. The adsorption of cobalt was found to be pH dependent.

We claim:

1. A process for the preparation of the polymeric composition (1)

$$A_{(x)}B_{(y)}C_{(z)}D_{(f)} \quad (1)$$

wherein A is any vinyl monomer containing hydroxyl group, B is any vinyl monomer bearing acidic group, C is any vinyl monomer containing an amino group and D is a cross linker bearing vinyl group and x, y, z and f are the mole fractions of A, B, C and D respectively in the final polymer and vary such that $0<x, y, z<1$ and f can vary between 0 and 1 and $x+y+z+f=1$, said process comprising preparing a complex of monomers A, B and C bearing the functional groups, and a source of cobalt in a solvent, adding a cross linker D, porogen and a free radical initiator to this mixture, polymerizing the mixture to obtain a cobalt imprinted polymer, extracting cobalt from the cobalt imprinted polymer to obtain the final polymer composition, wherein the porogen is a higher aliphatic alcohol selected from the group consisting of dodecanol, hexanol and octanol.

2. A process as claimed in claim 1 wherein the monomer (A) is selected from the group consisting of 2-hydroxy ethyl methacrylate, 2-hydroxy propyl methacrylate, N-methacryloyl seine and p-styrene phenol.

3. A process as claimed in claim 1 wherein the monor (B) is selected from the group consisting of N-(4-vinyl benzyl) iminodiacetic acid, acrylic acid, methacrylic acid, N-methacryloyl aspartic acid, N-methacryloyl glutamic acid, Acrylamido methane sulfonic acid, p-vinyl benzoic acid and 2-acetamidoacrylic acid.

4. A process as claimed in claim 1 wherein the monomer (C) is selected from the group consisting of N-vinyl imidazole, N-methacryloyl histidine, 4(5) vinyl imidazole, 4-vinyl pyridine and p-amino styrene.

5. A proess as claimed in claim 1 wherein the crosslinker (D) is selected from the group consisting of ethylene glycol dimethacrylate, triethylene glycol, dimethacrylate, divinyl benzene, trimethylol propane trimethacrylate, N,N' bis acrylamide, and trimethylol propane acrylate, glycerol dimethacrylate, bisphenol A dimethacrylate and bisphenol A diacrylate.

6. A process as claimed in claim 1 wherein the free radical initiator is selected from the group consisting of azobisisobutyronitrile, t-butyl hydroperoxide and benzoyl peroxide.

7. A process as claimed in claim 1 wherein the source of cobalt is a salt of cobalt selected from the group consisting of cobalt nitrate, cobalt choloride and cobalt acetate.

8. A process as claimed in claim 1 wherein the solvent is a lower aliphatic alcohol.

* * * * *